Feb. 22, 1966 B. C. SCHLUTER 3,237,006
HEADLIGHT DEVICE
Filed Sept. 13, 1963
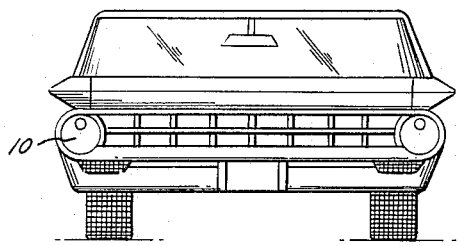
FIG. 1
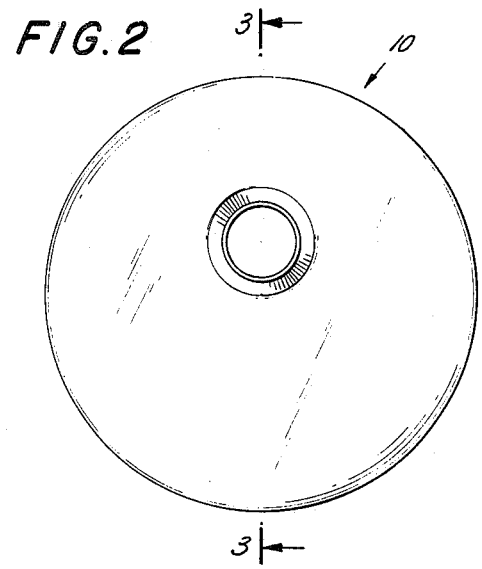
FIG. 2
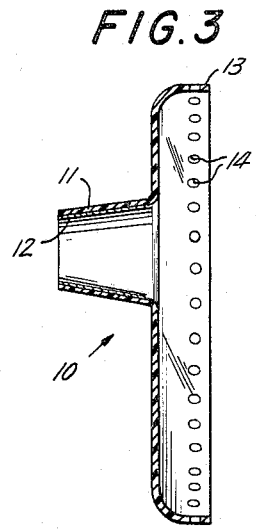
FIG. 3
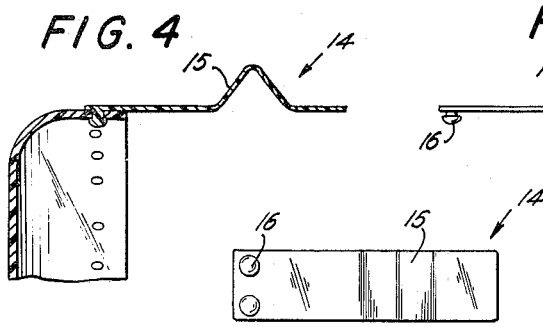
FIG. 4  FIG. 5
FIG. 6
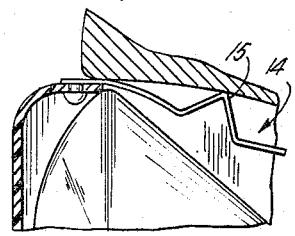
FIG. 7

United States Patent Office 3,237,006
Patented Feb. 22, 1966

3,237,006
HEADLIGHT DEVICE
Bernard C. Schluter, 108 Laurel Drive, Highlands, N.J.
Filed Sept. 13, 1963, Ser. No. 308,780
2 Claims. (Cl. 240—46.53)

This invention relates to a device selectively secured to automobile headlights and more particularly to a novel fog shield used over conventional automobile headlights during fog.

It is an object of this invention to provide a novel fog shield for automobile headlamps.

It is another object to provide an easily attached and easily removeable fog shield for such headlamps.

It is a further object to provide an amber plastic fog shield.

These and other objects of this invention will become apparent upon reading the following descriptive disclosure taken in conjunction with the accompanying drawing in which:

FIG. 1 is a front view of the fog light on a vehicle,
FIG. 2 is a front view of the device itself,
FIG. 3 is a transverse section view of the shield taken on line 3—3 of FIG. 2,
FIG. 4 is a detailed view of the manner of securing the separate clamp springs to the shield,
FIG. 5 is a side view of a clamp spring,
FIG. 6 is a bottom view of a clamp spring, and
FIG. 7 is a detailed view of the manner of securing the clamp in between the headlight and the surrounding chrome shield of the automobile.

Turning to the drawing:

The shield 10 is made of conventional transparent plastic material.

The shield is provided with an integral horn aperture or truncated cone 11 suitably positioned so that it may be placed directly in line with and over the light filaments of the headlights. These light filaments are off center in said conventional headlamps.

The horn is an aperture so that white light is transmitted directly from the filament of the lamp to the atmosphere.

Preferably the horn 11 is provided with a shiny or chrome coating 12 on the inside to concentrate the light.

The shield 10 is provided with an integral rim 13 having a plurality of suitable apertures 14x suitably spaced-apart therein.

A plurality of separate spring clamps 14 are provided for securing the fog shield to the automobile in the space between the headlamp and the chrome shield therefor of the automobile.

These spring clamps are preferably made of plastic but metal clamps are also operable.

The spring clamps 14 are flat resilient elements provided with a V-shaped portion or a hump 15 for forced locking insertion between the headlight and the chrome shield of the car.

The clamps are each provided with an integral pair protruberances or buttons 16. The buttons are suitably small to be press- or snap-fitted into the apertures 14 of the shield 10. These buttons 16 are suitably spaced-apart to engage adjacent apertures in the shield 10, thereby preventing rotational movement of the clamp 14 relative to the fog shield 10 to which it is secured.

In the operation of this invention when there is a demand for use of the shield as in a foggy or dusty atmosphere, the fog shields are removed from the inside of the car, where they are stored when not in use, and the fingers 14 thereof are forced into the slot opening between the headlamp and the metal chrome shield surrounding the headlamp making certain that the horn is positioned directly over the lamp filaments.

Generally three fingers 14 suitably spaced on the shield rim 13 are sufficient to effect a firm attachment of the shield to the headlight.

Since the spring 15 must be squeezed or flattened to enter the slot between the headlight and its adjacent metal chrome shield, upon insertion it seizes both the chrome rim and headlight once it is inserted beyond said slot.

Thus the spring 15 of the clamp is flattened in both the insertion step and also in the removal step in the use of this fog shield.

This device is useful on automobile, buses, tractors and the like. It is manually attached and manually removed without need of excessive force.

The horn permits use of a powerful penetrating white light to pierce the fog so that the driver of the car can see into the distance whereas the mixed white light and amber light of the amber shield permits the driver of another car to see the mixed light under foggy conditions.

I claim:

1. An automobile anti-fog shield for rapid attachment to automobile headlights comprising an integral amber colored transparent plastic round shield having a circular depending rim extending in the direction of the car headlight and a truncated horn aperture extending in the other direction, said horn being positioned off center to transmit linearly the white light from a headlight, said rim having a plurality of evenly spaced-apart holes therein and an integral dual pronged flat hump back spring clip, said prongs engaging adjacent holes in said rim whereby partial insertion of said clip between said headlight and the headlight frame secures removeably said shield to the automobile.

2. The shield of claim 1 wherein the inside of said horn is coated with a chromium coating.

References Cited by the Examiner
UNITED STATES PATENTS

| D. 152,807 | 2/1949 | Latousek. |
| 1,667,949 | 5/1928 | Ring _____ 240—46.53 |
| 2,371,080 | 3/1945 | Trautner _____ 240—46.01 X |
| 2,544,378 | 3/1951 | Cyr _____ 240—46.59 |
| 2,785,291 | 3/1957 | Bernstein _____ 240—46.57 |
| 2,957,073 | 10/1960 | Legge _____ 240—7.35 |

NORTON ANSHER, *Primary Examiner.*
C. R. RHODES, *Assistant Examiner.*